Patented Aug. 17, 1937

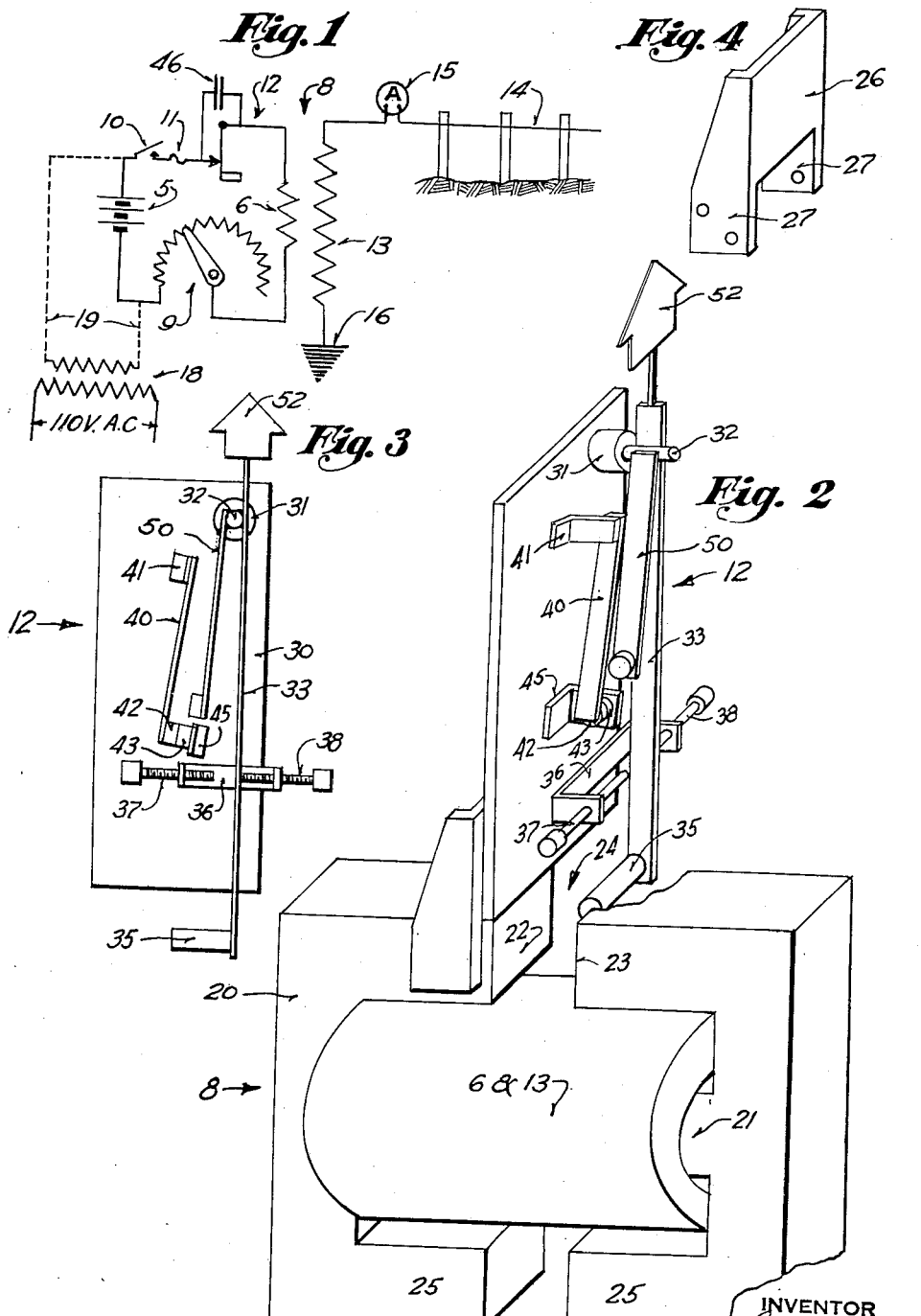

2,090,199

UNITED STATES PATENT OFFICE 2,090,199

ELECTRIC FENCE CHARGER

Leonard Heidger, West Allis, Wis.

Application August 12, 1935, Serial No. 35,830

5 Claims. (Cl. 175—357)

This invention relates to fences and more particularly to an electric fence capable of preventing farm animals from crossing the fence by reason of a periodic charge of electricity in the fence wire and is an improvement in applicant's co-pending application, Serial No. 5,951, filed February 11, 1935.

In farm work, and particularly during harvest time, it is highly desirable to have a way of rapidly fencing off parts of the farm and keeping the animals safely corralled in those parts.

The sensitiveness of animals to electricity suggests the possibility of a single wire fence charged by a constant electric current. Heretofore, two general types of apparatus have been used to charge the fence wire.

One of these methods involves the use of an ordinary induction coil or automobile ignition coil operated by a battery. These coils, however, have proved themselves totally incapable of handling the work due to high current consumption, and the necessity of constantly recharging the battery. The farmer, during harvest time has no time to watch storage batteries and attend to their charging.

The other type of charging apparatus utilizes thermostatic cut outs and light bulbs. Regenerative bulbs are also used in some systems. These, too, require too much current to be used on low voltage direct current, and therefore do not solve the problem.

One object of the present invention is to provide an electric fence which will operate on a low wattage and which will be effective in preventing the passage of farm animals therethrough.

A further object is to provide a machine which can be economically manufactured and which will be rugged and efficient.

Other objects will be apparent upon considering the following specification.

In the drawing:

Fig. 1 is a wiring diagram of the present invention, especially wired for a storage battery with an alternative connection to an A. C. power line, shown in dotted lines.

Fig. 2 is an isometric projection of the transformer unit used in the present invention with one corner of the transformer broken away to more clearly show another part.

Fig. 3 is a plan view of the circuit breaker shown in Fig. 2.

Fig. 4 is an isometric view of the bracket which supports the circuit breaker.

Referring to Fig. 1, which shows the circuit, a storage battery 5 is connected to the primary coil 6 of a current transformer, generally designated 8 and shown in Fig. 2, through a circuit breaker generally designated 12. A rheostat 9, a switch 10, and a fuse 11 may also be connected in series with the primary coil. A secondary coil 13 of the transformer 8 is connected to a fence 14 with an ammeter 15 connected in series in the circuit. The return to the secondary coil is made through the ground 16.

If it is desired to operate on 32 volts D. C. the transformer can be wound for that voltage.

If 110 v. A. C. is available a step down transformer 18 may be connected to the 110 v. line as shown and the secondary of the transformer 18 connected to the transformer 8 as shown by the dotted lines 19, with the storage battery 5 eliminated. This is preferable to winding the transformer 8 for 110 v. A. C. since the making and breaking of the circuit breaker 12 on a 110 v. circuit causes a decided radio interference.

The current transformer 8, comprises a primary coil 6 and a secondary coil 13, which may be wound as a single unit as shown in Fig. 2. The core 20 of the transformer is preferably laminated and extends through the center of the coils 6 and 13 as shown at 21 and extends around the top of the coils 6 and 13. The ends 22 and 23 of the core 20 terminate in spaced relationship and define an air space 24 between them which is in a relatively strong magnetic field when the primary coil 6 is energized. If desired the core may also extend under the coils 6 and 13 as shown at 25 with an air gap between the ends similar to the gap 24.

A bracket 26, best shown in Fig. 4, has a flat face with two legs 27—27 at right angles thereto, which are fastened by machine screws or rivets to one end of the core 20. The bracket supports the circuit breaker 12 (shown in Fig. 3).

The circuit breaker 12 is mounted on a base 30 which has a bearing 31 supported therein adjacent one corner of the base which rotatably supports a shaft 32. The shaft 32 carries an arm 33 which depends from the shaft. A plunger 35 is fixed on the lower end of the shaft and is adapted to swing into and out of the space 24 between the ends 22 and 23 of the core 20.

A bracket 36 is fixed on the base and has a pair of set screws 37 and 38 to limit the swing of the arm 33.

A contactor arm 40 is fixed to the base through a bracket 41, and has a contact element 42 fixed on the lower end thereof. The contact 42 forms a connection with a contact 43 which is supported on a bracket 45 on the base 30. A condenser 46 may be interposed across the points as shown in Fig. 1 to reduce sparking.

A breaker arm 50 is fixed to the shaft 32, and engages the contactor arm 40 to break the circuit across the contacts 42—43 when the plunger 35 moves into the magnetic field 24.

A signal 52 indicates when the device is operating.

The electrical connections are shown in Fig. 1.

*Operation*

When the switch 10 is thrown in to complete the circuit, energy flows from the battery 5, through the switch 10, the fuse 11, the bracket 41, the contact arm 40, across the points 42—43, and the bracket 45 to the primary coil 6 of the transformer 8. From the primary coil the current returns to the battery through the rheostat 9.

When the coil 6 is energized it creates a strong magnetic field across the air gap 24, which draws in the iron or soft steel plunger 35. When the plunger 35 swings into the air space the breaker arm 50 engages the arm 40 and breaks the circuit across the contact points 42—43. This de-energizes the core 20 and causes the plunger to fall back to its normal or lowermost position. When the plunger falls back the contact points 42—43 again make contact to re-energize the coil and start a new cycle.

At each make and break of the circuit a current is induced into the secondary coil, the intensity of which depends on well known electrical principles.

The screws 37—38 are adjusted so as to send a current over the fence at frequent enough intervals to keep the animals from breaking through the fence while the current is off.

Having thus described the invention it will be apparent that it is susceptible to various changes and modifications which fall within the principles brought out in the specification. It is not, therefore, desired to limit the invention to the precise form herein shown and described but only by the scope of the sub-joined claims.

What is claimed as new and desired to secure by Letters Patent is:

1. An electric fence charger of the character described, comprising a transformer including, a primary coil, a secondary coil, and a core extending through said coils and substantially surrounding the same, with the ends of the core terminating in spaced relationship; means to energize the primary coil, whereby a strong magnetic field is created between the ends of said core; a circuit breaker comprising, an iron plunger pivoted about an axis spaced therefrom and adapted to move into the space between the ends of the core upon energization of the primary coil, and means connected to the plunger to make and break the primary circuit as the plunger swings into and out of said space.

2. An electric fence charger of the character described, comprising a transformer including, a primary coil, a secondary coil, and a core extending through said coils and substantially surrounding the exterior thereof with the ends of the core terminating in spaced relationship; means to energize the primary coil, whereby a strong magnetic field is created between the ends of the core; a circuit breaker including, an iron plunger mounted to move into and out of the magnetic field in a plane perpendicular to the plane of the core between the ends of the core, and means connected to said plunger and operable to break the circuit.

3. An electric fence charger of the character described, comprising a transformer including, a primary coil, a secondary coil, and a core extending through said coils and substantially surrounding the same, with the ends of the core terminating in spaced relationship; means to energize the primary coil, whereby a strong magnetic field is created between the ends of the core; a bracket fixed on one end of the core; a circuit breaker fixed to said bracket, said circuit breaker including, a plunger adapted to move into the magnetic field between the ends of the core upon energization thereof, and means operable by said plunger to break the circuit through the primary coil.

4. An electric fence charger of the character described, comprising a transformer including, a primary coil, a secondary coil, and a core extending through said coils and substantially surrounding the same, the ends of said core terminating in spaced relationship; means to energize the primary coil and thereby create a strong magnetic field between the ends of the core; a bracket fixed on one end of the core; a circuit breaker fixed to said bracket, said circuit breaker comprising, a base, a bearing mounted in said base, a shaft rotatably mounted in said bearing, an arm fixed on the shaft and depending therefrom, an iron plunger fixed to said arm and adapted to swing into and out of the magnetic field between the ends of the core, and means operable by said plunger to break the circuit through said primary coil.

5. An electric fence charger of the character described, comprising a transformer including, a primary coil, a secondary coil, and an iron core extending through said coils and substantially surrounding the same, with the ends thereof terminating in spaced relationship; means to energize the primary coil, whereby a strong magnetic field is established between the ends of the core; a circuit breaker including, a member adapted to move into and out of said magnetic field at right angles thereto, and means connected to said last named member to break said circuit.

LEONARD HEIDGER.